May 1, 1962 J. CLARK 3,031,994
HYDRAULIC INTERNAL PIPE LINE UP CLAMP
Filed March 25, 1958 3 Sheets-Sheet 1

INVENTOR.
JULIUS CLARK
BY Victor J. Evans & Co.
ATTORNEYS

May 1, 1962

J. CLARK 3,031,994

HYDRAULIC INTERNAL PIPE LINE UP CLAMP

Filed March 25, 1958

INVENTOR.
JULIUS CLARK

ATTORNEYS

INVENTOR.
JULIUS CLARK

United States Patent Office 3,031,994
Patented May 1, 1962

1

3,031,994
HYDRAULIC INTERNAL PIPE LINE UP CLAMP
Julius Clark, Rte. 1, Box 25, Broken Arrow, Okla.
Filed Mar. 25, 1958, Ser. No. 723,878
2 Claims. (Cl. 113—102)

This invention relates to a line up device, and more particularly to a device for use in lining up pipes which are to be welded or otherwise worked on.

The object of the invention is to provide a pipe line up device which is hydraulically actuated or controlled so that a pair of pipes can be accurately alined whereby the ends of such pipes can be welded or otherwise worked upon.

A still further object of the invention is to provide a line up apparatus which includes a hydraulic mechanism that permits a plurality of shoes to be expanded or contracted, so that for example the shoes can be moved outwardly to engage the inner surface of each of a pair of pipes which are to be lined up, and wherein a novel means is provided for controlling actuation of the hydraulic mechanism.

A further object of the invention is to provide a hydraulic internal pipe line up clamp which is extremely simple and inexpensive to manufacture.

Other objects and advantages will be apparent during the course of the following description.

In the accompanying drawings, forming a part of this application, and in which like numerals are used to designate like parts throughout the same.

FIGURE 4 is a sectional view taken on the line 4—4 of FIGURE 1.

FIGURE 5 is a sectional view taken on the line 5—5 of FIGURE 1.

Referring in detail to the drawings, the numeral 10 indicates the hydraulic internal pipe line up clamp of the present invention, and the clamping device 10 is adapted to be used for lining up pipes such as the pipes 11 and 12 so that the pipes can be worked on, as for example when a weld is to be applied at the joint 13.

Figure 1:
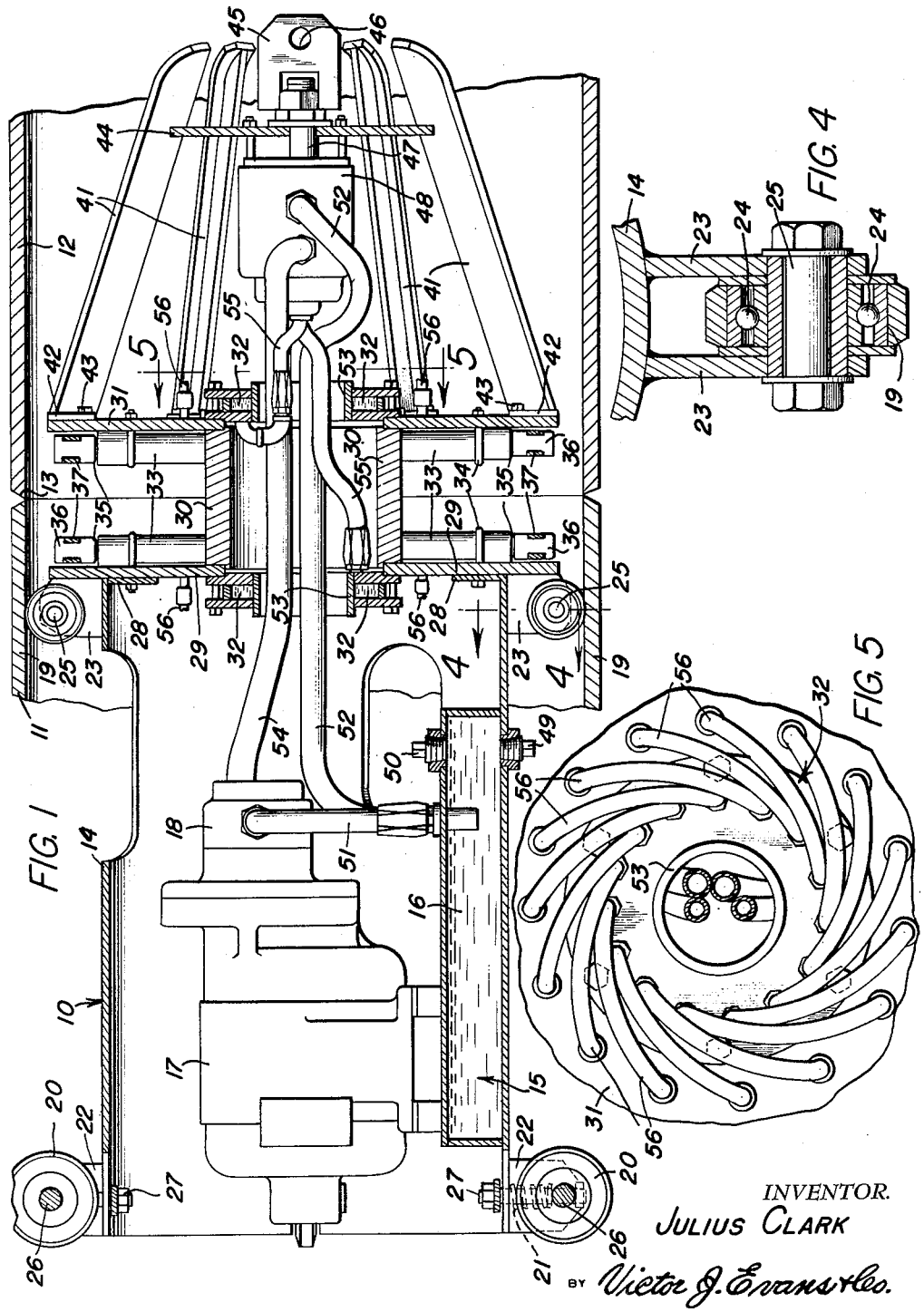
FIGURE 1 is a fragmentary sectional view illustrating the hydraulic internal pipe line up clamp of the present invention and showing the device mounted within a pair of pipes which are to be welded or otherwise worked on, the pipes being shown in section, and the device being shown in retracted or closed position.

The device 10 includes a hollow cylindrical housing 14 which has a hydraulic reservoir 15 mounted in the lower portion thereof, and the reservoir 15 is adapted to hold a suppply or quantity of hydraulic fluid 16, FIGURE 1. Arranged in the housing 14 is a motor 17 which serves to operate a conventional fluid pump 18. As shown in FIGURE 1, ears 23 extend outwardly from one end of the housing 14, and the ears 23 support rollers or wheels 19, and the rollers 19 may have ball bearings 24 associated therewith, FIGURE 4. The wheels or rollers 19 may be supported on axles 25. Extending outwardly from the other end of the housing 14 are ears 22 which serve to provide a support for other rollers or wheels 20, and associated with the wheels 20 are pins 27 which have coil springs 21 thereon, and the wheels 20 are provided with axles 26.

2

The numeral 28 indicates a circular plate which is secured as by welding to an end of the housing 14, and the flange 28 has secured thereto a first circular plate 29. The numeral 30 indicates a cylindrical collar which is secured in any suitable manner to the first plate 29, and there is further provided a second circular plate 31 which is also secured to the collar 30. The plates 29 and 31 are arranged in spaced parallel relation with respect to each other.

Arranged adjacent the inner portion of each of the plates 29 and 31 is a fluid holding chamber or reservoir 32. There is further provided a plurality of radially disposed hydraulic cylinders 33, and the cylinders 33 are connected to the plates 29 and 31 by means of U-bolts 34. Extending outwardly from each cylinder 33 is a movable piston 35, and a shoe 36 is connected to the outer end of each piston 35, the shoes 36 being mounted for movement into and out of engagement with the inner surface of the pipe such as the pipes 11 and 12.

The shoes 36 on the outer ends of the pistons 35 are interconnected by means of linkage 37, and the numeral 39 indicates coil springs or return springs which have one end connected to a link member 38, while the other ends of the springs 38 are anchored as at 40 to the corresponding plate 29 or 31.

As shown in FIGURE 1, there is further provided a plurality of divergent or angularly arranged guide arms 41 which are provided with flanges 42 that the secured to the plate 31 in any suitable manner, as for example by means of securing elements 43. A support member 44 is secured within the guide arms 41 in any suitable manner, as for example by welding. The numeral 45 indicates a control member which is provided with an opening 46 whereby a rod or handle or the like can be arranged in engagement with the opening 46 for operating the control member 45. The valve assembly 48 is operated by a control rod 47 which is connected to the control member 45.

The reservoir 15 is provided with a drainage plug 49, and there is further provided a filling plug 50. The numeral 51 indicates a supply conduit which extends from the pump 18 to the reservoir 15. A conduit 52 is adapted to convey hydraulic fluid 16 from the reservoir 15 to the control valve assembly 48. Certain of these conduits are adapted to extend through cylindrical sleeves 53 as well as through the collar 30. The numeral 54 indicates a return conduit which extends between the valve assembly 48 and the pump 18. Conduits 55 extend between the valve assembly 48 and the chambers or reservoirs 32, and there is further provided conduits 56 which serve to connect the cylinders 33 to the chambers 32.

From the foregoing, it is apparent that there has been provided an apparatus which is especially suitable for lining up pipes such as the pipes 11 and 12, as for example when such pipes are to be welded at their seam or joint 13. In use, the device 10 may be arranged in a pipe such as the pipe 11, and the wheels 19 may engage the inner surface of the pipe 11. It is to be noted that the other wheels or rollers 20 have spring mountings as for example the springs 21 are provided and this permits the axles 26 to move in or out so that the wheels 20 will ride snugly against the inner surface of the pipe 11. Then, the other pipe 12 which is to be welded to the pipe 11 can be moved so that it is in the position shown in FIGURE 1, and the arms 41 act as guides which help insure that the pipe 12 will be in the proper position with respect to the pipe 11. With the pipes 11 and 12 arranged as shown in FIGURE 1, it will be seen that a rod or the like can be arranged in engagement with the opening 46 of the control member 45 so that by turning such rod, the control member 45 can be rotated and this will cause corresponding rotation of the rod 47 through the support member 44. The valve assembly 48 is of conventional construction and is controlled by this rotation of the rod 47. For example, with the motor 17 operating, it will be seen that the hydraulic fluid will be pumped by the pump 18 through the conduit 51 and then into the reservoir 15, and then the hydraulic fluid 16 will pass through the conduit 52 and into the valve assembly 48. From the valve assembly 48 the hydraulic fluid will pass out through the pair of conduits 55 and enter the pair of reservoirs or chambers 32. This hydraulic fluid will then pass from the chambers 32 through the conduits 56 and the hydraulic fluid will enter the lower ends of the cylinders 33 to cause the pistons 35 to move outwardly.

As the pistons 35 move outwardly, they carry the shoes 36 outwardly so that the plurality of shoes will engage the inner surfaces of the pipes 11 and 12 whereby these shoes will insure that the pipes 11 and 12 are accurately aligned so that they can be efficiently welded at the point 13. The linkage 37 serves to maintain the shoes 36 in their proper aligned relationship, and it will be seen that the shoes 36 are spaced equally about the interior of the pipes. Thus, it will be seen that the shoes 36 can move from the retracted position shown in FIGURE 1 to the expanded position shown in FIGURE 3 or to the position shown in FIGURE 2, as for example when the pipes are to be aligned.

Figure 2:
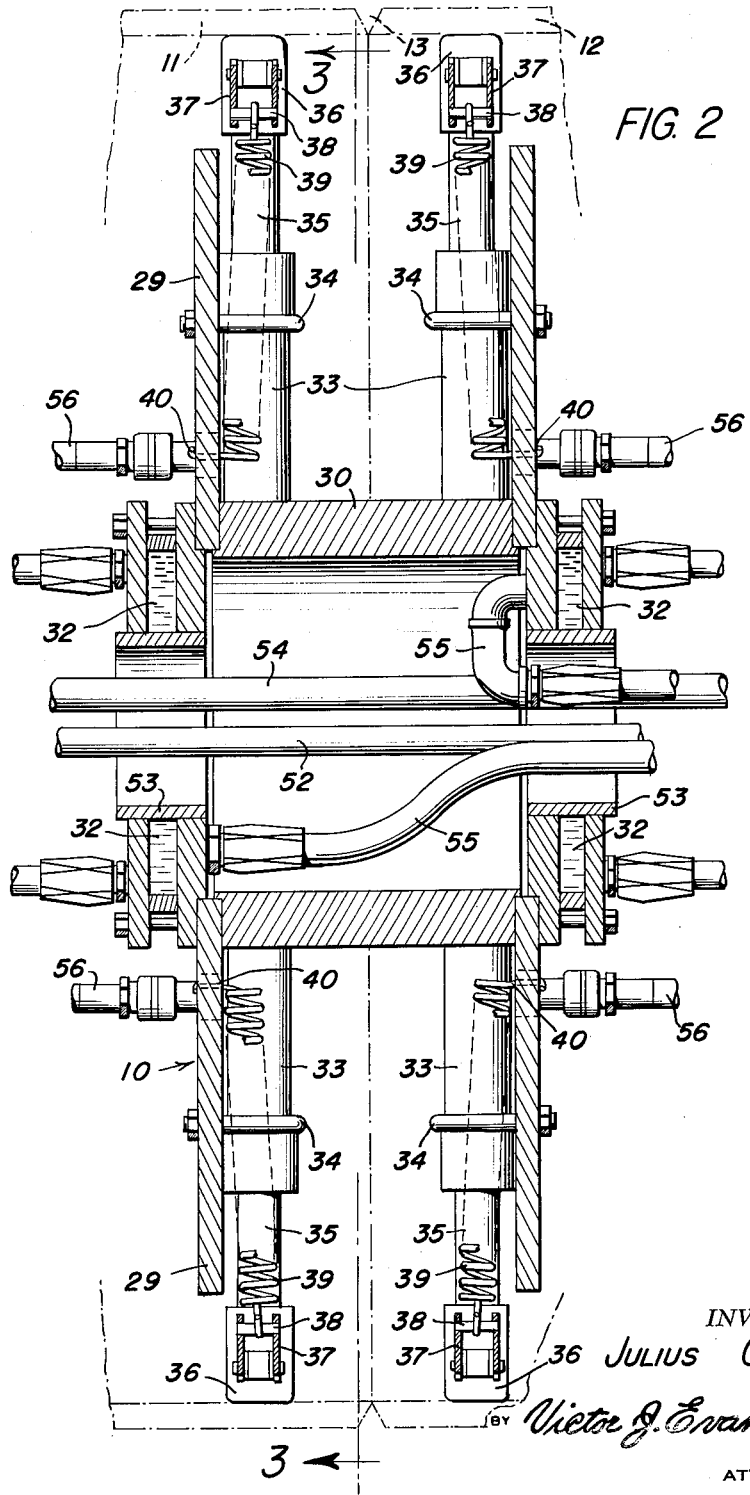
FIGURE 2 is an enlarged fragmentary sectional view of the clamp of the present invention, and showing the parts in expanded position.
Figure 3:
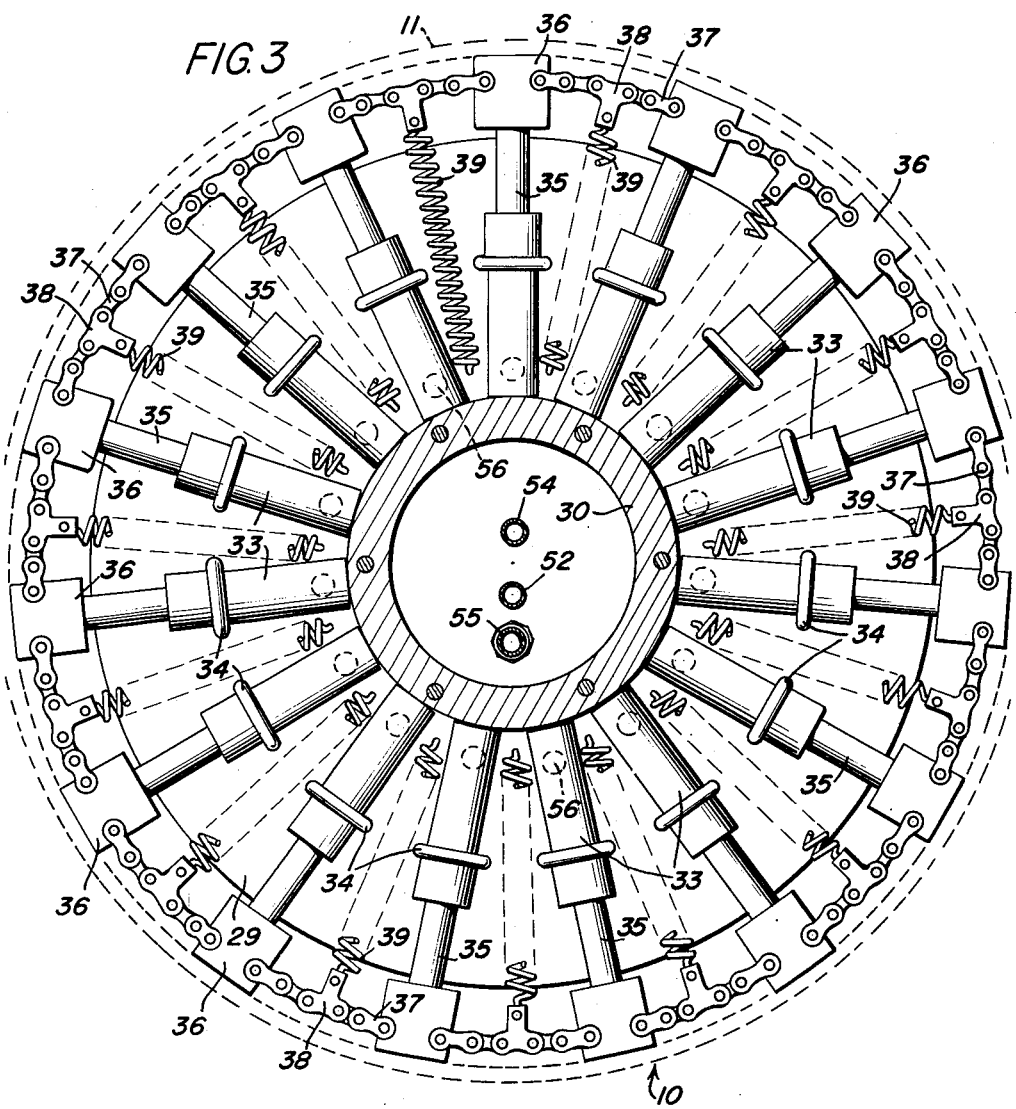
FIGURE 3 is a sectional view taken on the line 3—3 of FIGURE 2.

When the shoes 36 are to be moved to the retracted position shown in FIGURE 1 from the position shown in FIGURE 2 or 3, as for example after the welding has been completed, then the control member 45 can be rotated by means of a member arranged in engagement with the opening 46, so that again the rod 47 will be turned to actuate the valve 48 so as to permit a reverse flow of hydraulic fluid. That is, hydraulic fluid can empty from the cylinders 33 whereby the springs 39 will serve to retract the parts from the position shown in FIGURES 2 and 3 to the position shown in FIGURE 1. This hydraulic fluid can thus flow back through the conduits 56 and into the chambers 32, and from the chambers 32, pressure can be relieved through the conduits 55, whereby eventually the fluid pressure can return to the pump 18 through the conduit 54.

The parts can be made of any suitable material and in different shapes or sizes.

It is to be noted that all of the shoes 36 are actuated or moved in and out simultaneously and this serves to insure that both pipes 11 and 12 will be properly aligned when the device is properly actuated, and by efficiently aligning the pipes 11 and 12, the job of welding the seam is greatly facilitated.

The hydraulic clamp of the present invention may be operated with either A.C. or D.C. current. Furthermore, the device may be operated with a 6-volt motor by mounting a battery alongside of the motor and the oil pump. When pressure in the hydraulic system is reduced, the springs 39 serve as return springs whereby the parts will be moved from the position shown in FIGURES 2 and 3 to the position shown in FIGURE 1. The linkage 37 serves to connect all of the shoes together so that the action of the shoes will be uniform.

In use, a long handled member can be used for engaging the opening 46 whereby the member 45 can be rotated. The arms 41 help to protect the front end of the device and also serve as guides when the pipes are being aligned. The shoes 36 form a perfect circle as they move outwardly which insures that the pipes will be properly lined up. The housing 14 serves as a support for the motor and pump and also serves to support the wheels such as the wheels 19 and 20.

Figure 6:
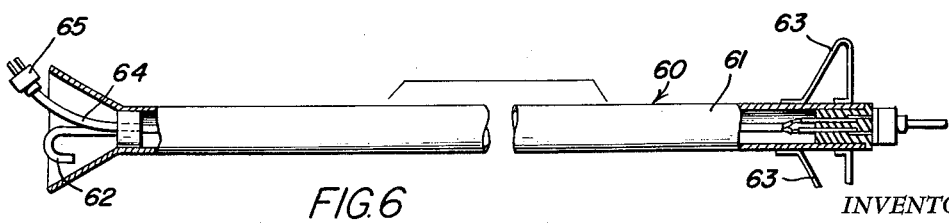
FIGURE 6 is an elevational view of the control member, and with parts broken away and in section.

The springs 21 permit the wheels 20 to move in and out and this is necessary because as the clamp is drawn or moved through a pipe line by means of a handle such as the handle shown in FIGURE 6 which is connected to the control member 45, the wheels 20 must retract and expand. This is because the pipe, after it is placed in the bending machine, is bent often as much as 30 degrees which causes the pipe to have irregularities.

In FIGURE 6 there is indicated the long handled member which is indicated generally by the numeral 60, and this member is used for engaging the member 45. The member 60 includes a main section 61 which has a hook 62 on one end thereof for engagement with the opening 46 in the member 45. Handles or hand grips 63 are connected to the other end of the member 60 so as to facilitate the manual handling thereof, and the numeral 64 indicates a conductor or wire assembly which has a plug 65 on one end thereof, while the other end of the conductor 64 is adapted to be connected to a suitable source of electrical energy. Thus, the motor 17 receives its current through the plug 65, and the hook 62 is adapted to engage the opening 46 so as to provide a means for controlling operation of the valve assembly. The conductor 64 thus serves to provide a power line which runs through the member 60 and the operator can grip the handles 63 and with the hook 62 connected to the opening 46, the clamp can be readily pulled through a pipe as previously described.

Minor changes in shape, size and rearrangement of details coming within the field of invention claimed may be resorted to in actual practice, if desired.

I claim:

1. In a hydraulic internal pipe line up clamp, a hollow cylindrical housing, a fluid reservoir mounted in the lower portion of said housing for holding a quantity of hydraulic fluid, a motor positioned in said housing, a pump operated by said motor, ears extending outwardly from one end of the housing, rollers supported by said ears, a flange secured to an end of said housing, a first plate secured to said flange, a cylindrical collar secured to said first plate, a second plate secured to said collar, said plates being arranged in spaced parallel relation with respect to each other, a pair of fluid holding chambers arranged adjacent the ends of the collar, a plurality of radially disposed cylinders arranged contiguous to the inner surface of each plate and connected thereto, a movable piston projecting outwardly from each cylinder, a shoe connected to the outer end of each piston, linkage connecting said shoes together, a plurality of coil springs each having an end connected to said linkage and their other ends anchored to said plates, a plurality of guide arms extending from said second plate and connected thereto, a support member mounted within said guide arms, a control member spaced outwardly from said support member, a valve assembly spaced inwardly from said support member and operatively connected to said control member, and conduits operatively connecting said valve assembly to said reservoir, pump, fluid chambers and cylinders.

2. In a hydraulic internal pipe line up clamp, a housing, a fluid reservoir mounted in said housing for holding a quantity of hydraulic fluid, a motor positioned in said housing, a pump operated by said motor, ears extending from said housing, rollers supported by said ears, a flange secured to said housing, a first plate secured to said flange, a collar secured to said first plate, a second plate secured to said collar, fluid holding chambers arranged adjacent the collar, cylinders arranged contiguous to each plate and connected thereto, a movable piston projecting outwardly from each cylinder, a shoe connected to each piston, linkage connecting said shoes together, resilient means connected to said linkage and to said plate, guide arms extending from said second plate and connected thereto, a support member mounted within said guide arms, a control member spaced from said support member, a valve assembly spaced from said support member, and operatively connected to said control member, and conduits operatively connecting said valve assembly to said reservoir, pump, fluid chambers and cylinders.

References Cited in the file of this patent

UNITED STATES PATENTS

| | | |
|---|---|---|
| 963,603 | Lunceford | July 5, 1910 |
| 2,452,867 | Price et al. | Nov. 2, 1948 |
| 2,638,069 | Mearns | May 12, 1953 |
| 2,800,867 | Smith | July 30, 1957 |
| 2,830,551 | Miller | Apr. 15, 1958 |

FOREIGN PATENTS

| | | |
|---|---|---|
| 737,089 | Great Britain | Sept. 21, 1955 |